Nov. 3, 1959　　　B. H. CANADY ET AL　　　2,911,256

DUAL WHEEL MOUNTING

Filed March 4, 1957

INVENTORS
BUEL H. CANADY
ROSCOE C. HUTCHISON

BY　B. P. Fishburn, Jr.

ATTORNEY

2,911,256

DUAL WHEEL MOUNTING

Buel H. Canady, Huntington Park, and Roscoe C. Hutchison, Los Angeles, Calif.

Application March 4, 1957, Serial No. 643,751

1 Claim. (Cl. 301—36)

The present invention relates to improvements in dual wheel mountings for vehicles.

Prior art dual wheel mountings of the general type disclosed by United States Patents 1,721,313 to A. E. Nelson and 2,217,646 to C. L. Eksergian, have employed a screw-threaded stud secured to the wheel hub and projecting outwardly therefrom. The first or inner dual wheel is applied over the stud with its inner side directly abutting the outer face of the hub. The first or inner nut is next applied to the stud and a beveled shoulder on the inner nut engages within a recess in the outer side of the inner wheel to center the same when the inner nut is tightened. When the inner nut is tightened, the inner wheel is clamped tight against the outer face of the hub. Following this, the outer wheel is applied over the inner nut and contacts the outer face of the inner wheel, and finally a second or outer nut is threaded onto the inner nut and has a beveled shoulder to engage within a recess of the outer wheel for centering the same when the outer nut is tightened. Tightening of this outer nut forces the outer wheel into tight engagement with the inner wheel and the wheel mounting is complete. This conventional construction is disclosed in Figure 2 of the above-referred to Patents 1,721,313 and 2,217,646.

This conventional construction has proven unsatisfactory in several important respects. Since it is necessary to remove both the outer and inner nuts in the above-described dual wheel mounting in order to dismount both wheels, the constant removing and applying of the inner nut to the stud rapidly wears out the threads upon the stud until the same either breaks off or has its threads stripped, and the stud must then be replaced. Secondly, in the conventional mounting, the inner end of the inner nut is always spaced from the outer face of the hub and is never drawn tightly against the hub and this increases the tendency for breaking off of the wheel studs regularly. It is also a difficult task with the conventional arrangement to position the heavy inner wheel over the studs and hold it in place until the inner nut can be applied.

The present improved construction definitely overcomes the above defects present in the described conventional mounting, and the improved construction includes additional features and advantages which are not present in the prior art.

In the improved mounting, an elongated holding nut of somewhat greater length than the conventional inner nut is employed and this elongated holding nut is applied to the threaded stud with its inner end tightened directly against the hub, prior to the mounting of the inner wheel. The inner wheel is applied over the elongated holding nut and engages a beveled shoulder of the elongated holding nut to be centered thereby and the inner face of the inner wheel remains spaced somewhat from the hub. Next the outer wheel is applied over the elongated holding nut and contacts directly with the inner wheel, and the outer clamping nut is then threaded onto the elongated holding nut with its tapered shoulder engaging a centering recess in the outer wheel. Tightening of the outer clamping nut now tightly clamps the inner and outer wheels together and also clamps the inner wheel to the beveled shoulder of the elongated holding nut, completing the assembly or mounting.

With this arrangement, both the outer and inner wheels are readily demountable by removal of the outer clamping nut only, and it becomes entirely unnecessary to remove the elongated holding nut, and hence the wear and strain upon the threads of the stud by constant removal of the elongated holding nut is entirely eliminated. Additionally, the breaking off of the stud is eliminated to a great extent by having the inner flat end of the elongated holding nut in direct engagement with the outer face of the hub rather than spaced therefrom, as in the prior art. Additionally, the mounting or assembling of the dual wheels is rendered easier because the diameter of the elongated holding nut is only slightly smaller than the openings in the dual wheels, and the latter will slide readily into place over the elongated holding nut, prior to application of the outer clamping nut. A great deal of time and labor will be saved in the removing and mounting of the dual wheels, due to the fact that it will only be necessary to remove and apply the outer clamping nut rather than both the elongated holding nut and the outer clamping nut, as in the prior art. The space between the inner face of the inner wheel and the hub of the wheel is for two important purposes in the improved mounting. First, this space provides for draw between the inner wheel and hub as the wheel openings and beveled shoulders wear and as the assembly is tightened through the medium of the outer clamping nuts. The space between the inner wheel and hub also serves as a cooling space which aids in the cooling of the brake drums as the latter tend to overheat through constant application of the brakes. These features are entirely lacking in the teachings of the prior art.

The above introduction to the invention embodies the principal objects thereof and other objects and advantages will become apparent during the course of the following description.

In the accompanying drawings forming a part of this application and in which like numerals are employed to designate like parts throughout the same:

Figure 1:
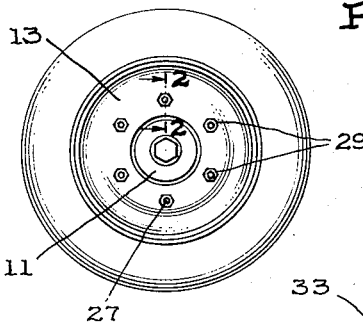
Figure 1 is a side elevation on a greatly reduced scale of a dual wheel assembly embodying the invention.
Figure 2:
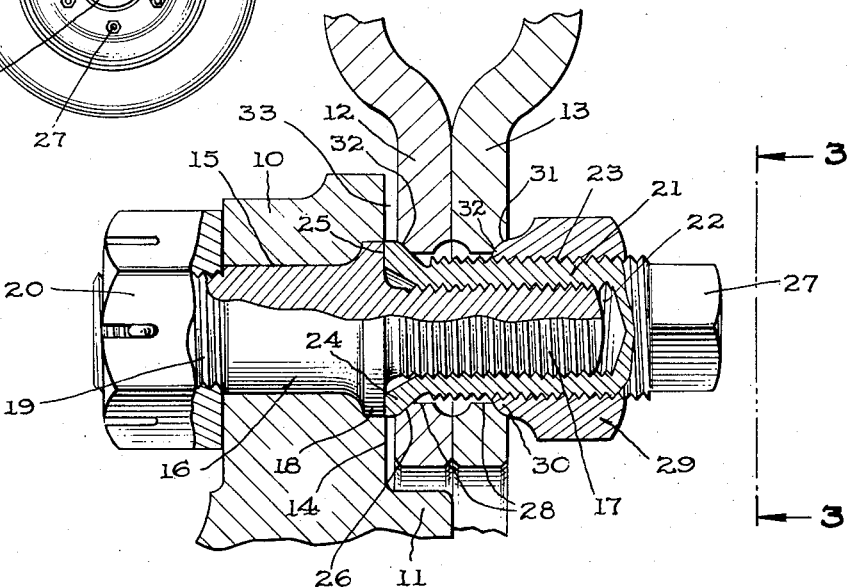
Figure 2 is an enlarged fragmentary radial section taken on line 2—2 of Figure 1.
Figure 3:
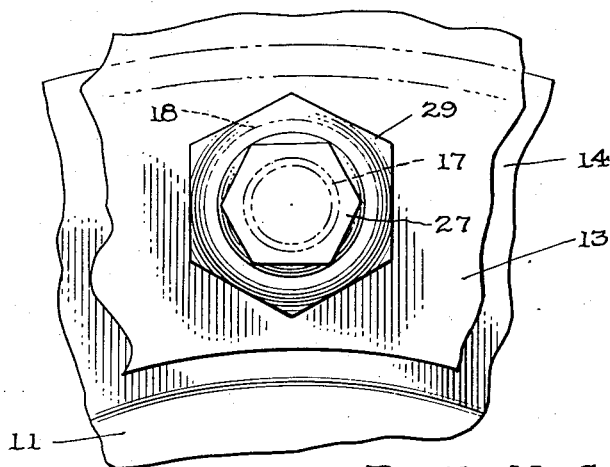
Figure 3 is a fragmentary elevational view taken on line 3—3 of Figure 2.

In the drawings, wherein for the purpose of illustration is shown a preferred embodiment of the invention, the numeral 10 designates the flange of the wheel hub 11 upon which inner and outer wheel bodies 12 and 13 are to be mounted through the medium of the present invention. The hub flange 10 has the usual flat outer face 14 and is provided with circumferentially spaced openings 15 for the reception of conventional studs 16 having outwardly projecting screw-threaded portions 17 and shoulders 18 which engage within recesses in the flat face 14 so as to be flush with such face as shown in Figure 2. The studs 16 also have inner screw-threaded portions 19 extending inwardly of the flange 10 for the reception of inner locking nuts 20 which serve to lock the studs securely to the hub flange 10.

The screw-threaded portion 17 of each stud 16 has mounted thereon an elongated holding nut 21 having an internally screw-threaded bore 22 receiving the stud portion 17 and also being externally screw-threaded as shown at 23. The elongated holding nut 21 has an enlarged inner head portion 24, provided with a flat annular end face 25, adapted to directly engage the flat face 14 of the hub flange and the stud shoulder 18. The enlarged head portion 24 is shaped so as to provide an annular beveled shoulder 26, spaced from the hub face 14 as shown in Figure 2. At its outer end, the elongated holding nut 21 is provided with an integral polygonal wrench lug 27, as shown. The outside diameter of the screw-threaded elongated holding nut 21 is slightly smaller than the diameters of the circumferentially spaced openings 28 formed through the wheel bodies 12 and 13. Because of this arrangement, both of the wheel bodies 12 and 13 may readily slide over the elongated holding nut 21 when being mounted in the manner illustrated in Figure 2.

An outer clamping nut 29 has screw-threaded engagement with the external screw-threads 23 of the elongated holding nut, and the length of the elongated holding nut 21 is such that it will project outwardly of the outer clamping nut 29 and have screw-threaded engagement with the outer clamping nut for the full length of the latter when both the inner and outer wheel bodies 12 and 13 and associated elements are assembled as in Figure 2. The outer clamping nut 29 has a reduced inner end portion 30, providing a beveled shoulder 31 which is spaced from and opposite to the shoulder 26 of the elongated holding nut in assembly, and of the same shape and diameter as the shoulder 26.

The wheel bodies 12 and 13 are provided at their openings 28 in the usual manner with beveled recesses 32, receiving the beveled shoulders 26 and 31 in the manner shown in Figure 2. The recesses 32 coact with the beveled shoulders 26 and 31 for properly centering the wheel bodies 12 and 13 with respect to the studs 16 and also for providing the desired wedge or draw action to frictionally lock the parts together when the outer clamping nut 29 is drawn up tightly.

In order to mount the dual wheel, the elongated holding nut 21 is first applied to the stud 16 and tightened so that its flat end 25 is clamped securely against the flat face 14 of the hub. The inner wheel body 12 is next applied over the elongated holding nuts 21 and its beveled recesses 32 receive the beveled shoulders 26 of the elongated holding nuts. Next, the outer wheel body 13 is applied over the elongated holding nuts 21 and directly engages the inner wheel body 12, as shown, and the outer clamping nuts 29 are now applied to the elongated nuts 21 and have their shoulders 31 received within the recesses 32 of the outer wheel body 13 to complete the mounting of the dual wheel.

It will be noted that a distinct space 33 is provided between the outer flat face 14 of the hub flange and the inner wheel body 12. This space serves two important purposes in the improved construction, first, to provide a cooling space between the inner wheel body 12 and hub flange 10 to aid in dissipating heat generated by the brakes, and second, to allow for draw of the wheel bodies 12 and 13 toward the hub when the outer clamping nut 29 is tightened.

It will be further apparent that in order to dismount both the inner and outer wheel bodies 12 and 13, it is merely necessary to remove the outer clamping nuts 29 and slide both of the wheel bodies outwardly over the elongated holding nuts 21, and it is unnecessary to disturb the elongated holding nuts 21 at this time. This feature of the invention is extremely important because the continual removing and applying of the elongated holding nuts 21, as required by the prior art, is completely avoided and the screw-threads 17 of the studs 16 are not subjected to the continuous wear caused by the removal and replacement of the elongated holding nuts 21. Consequently, with the use of the present construction, it is not only much simpler to mount and dismount both the inner and outer wheel bodies 12 and 13, but the useful life of the studs 16 is greatly prolonged due to the fact that the elongated holding nuts 21 do not have to be removed when the wheel bodies are dismounted. If it is desired occasionally to remove the elongated holding nuts 21 and replace them with new elongated holding nuts, this is a much simpler and far less expensive operation than the frequent replacement of the entire studs 16, as is commonly required with the use of the prior art dual wheel mountings.

The construction adequately and securely supports the inner and outer wheel bodies 12 and 13, since annular shoulders 26 and 31 engage within the recesses 32 at the outer sides of the wheel bodies, and the inner opposed faces of the wheel bodies 12 and 13 directly contact each other as shown in Figure 2. A secure and stable mounting for the inner and outer wheel bodies is provided and the space 33 allows for adequate draw when the outer clamping nuts 29 are tightened and also allows heat to be dissipated, as explained.

It is to be understood that the form of the invention herewith shown and described is to be taken as a preferred example of the same, and that various changes in the shape, size and arrangement of parts may be resorted to, without departing from the spirit of the invention and scope of the subjoined claim.

Having thus described the invention, we claim:

A dual wheel mounting comprising a hub having a substantially flat outer face and a plurality of circumferentially spaced openings arranged adjacent to the periphery of the hub and extending axially thereof, said substantially flat face having recesses leading into the inner ends of said openings, a plurality of studs for insertion within said openings, said studs being provided near their longitudinal centers with flanges extending radially beyond said studs and held within said recesses, the outer faces of the flanges being substantially flush with the outer face of the hub, said studs extending axially inwardly beyond the hub and having screw-threaded portions, locking nuts carried by the screw-threaded portions and cooperating with the flanges to have clamping engagement with said hub, said studs including portions extending axially outwardly of the hub and the flanges, said stud portions being externally screw-threaded, elongated holding nuts internally screw-threaded for engagement with the said screw-threaded stud portions, said elongated holding nuts being provided with annular shoulders at their inner ends, said shoulders extending radially beyond the elongated holding nuts, the ends of the shoulders being arranged to engage the flanges of the studs, said shoulders having outwardly tapering outer faces and circumferential portions, said circumferential portions holding the large ends of said outer tapered portions spaced from the outer face of the hub, said elongated holding nuts being externally screw-threaded, inner and outer wheel bodies having smooth central openings which are sufficiently small so that they substantially slidably contact with the outer screw-threads of the elongated holding nuts to guide the inner and outer wheel bodies in place when they are being centered, the inner wheel body being provided at its inner openings and upon its inner face next to the hub with outwardly tapering recesses to fit upon the outwardly tapering faces of said shoulders so that the shoulders permanently retain the inner wheel body spaced from the outer face of the hub for preventing contact between these parts, the outer wheel body being provided with outwardly tapering recesses at its central openings, and outer clamping nuts having internal screw-threads for engagement with the external screw-threads of the elongated holding nuts, the outer clamping nuts having inwardly tapering portions to fit within the inwardly tapering recesses of the outer wheel body, the exterior screw-threads of the elongated holding nuts extending throughout the entire length of the outer clamping nuts when the outer clamping nuts are in the inner clamping position.

References Cited in the file of this patent

UNITED STATES PATENTS

| | | |
|---|---|---|
| 1,996,140 | Bourdon | Apr. 2, 1935 |
| 2,217,646 | Eksergian | Oct. 8, 1940 |
| 2,844,409 | Eksergian | July 22, 1958 |

FOREIGN PATENTS

| | | |
|---|---|---|
| 1,079,590 | France | May 19, 1954 |